(12) United States Patent
Qin et al.

(10) Patent No.: US 10,921,653 B2
(45) Date of Patent: Feb. 16, 2021

(54) DISPLAY PANEL, DISPLAY APPARATUS AND CONTROL METHOD THEREOF

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Peng Qin, Beijing (CN); Cheng Zuo, Beijing (CN); Kangpeng Dang, Beijing (CN); Yang Rao, Beijing (CN); Bo Wang, Beijing (CN); Hong Chen, Beijing (CN); Lihua Jiang, Beijing (CN); Zhongli Luo, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/428,329

(22) Filed: May 31, 2019

(65) Prior Publication Data
US 2019/0369449 A1 Dec. 5, 2019

(30) Foreign Application Priority Data
Jun. 1, 2018 (CN) .......................... 2018 1 0556019

(51) Int. Cl.
*G02F 1/13* (2006.01)
*G02F 1/1343* (2006.01)
(Continued)

(52) U.S. Cl.
CPC ...... *G02F 1/134309* (2013.01); *G02F 1/1368* (2013.01); *G02F 1/13338* (2013.01);
(Continued)

(58) Field of Classification Search
CPC ........... G02F 1/134309; G02F 1/13338; G02F 1/13624; G02F 1/1368;
(Continued)

(56) References Cited

U.S. PATENT DOCUMENTS 10,636,380 B1* 4/2020 Xu ........................ G09G 3/3688
2005/0174529 A1* 8/2005 Fukushima ........... G02F 1/1323
349/197
(Continued)

FOREIGN PATENT DOCUMENTS

CN 101526702 A 9/2009
CN 105138173 A 12/2015
(Continued)

OTHER PUBLICATIONS

First Chinese Office Action issued in Chinese Application No. 201810556019.2, dated Jul. 3, 2020, with English language translation.

*Primary Examiner* — Ibrahim A Khan
(74) *Attorney, Agent, or Firm* — McDermott Will and Emery LLP

(57) ABSTRACT

A display panel includes a first substrate, a second substrate, and a liquid crystal layer. The first substrate includes a first common electrode layer and a pixel electrode layer. The first common electrode layer is configured to receive a first common voltage signal to form a first electric field with the pixel electrode layer. The second substrate is disposed opposite to the first substrate, and includes a second common electrode layer. The second common electrode layer is configured to receive a second common voltage signal to
(Continued)

form a second electric field with the pixel electrode layer. The liquid crystal layer is disposed between the first substrate and the second substrate.

16 Claims, 9 Drawing Sheets

(51) Int. Cl.
| | | |
|---|---|---|
| *G02F 1/1333* | (2006.01) | |
| *G02F 1/1362* | (2006.01) | |
| *G02F 1/1368* | (2006.01) | |
| *G06F 3/041* | (2006.01) | |
| *G09G 3/36* | (2006.01) | |
| *G06F 3/044* | (2006.01) | |

(52) U.S. Cl.
CPC ........ *G02F 1/13624* (2013.01); *G06F 3/0412* (2013.01); *G06F 3/0416* (2013.01); *G09G 3/3696* (2013.01); *G02F 2001/134345* (2013.01); *G02F 2201/121* (2013.01); *G02F 2201/123* (2013.01); *G06F 3/044* (2013.01); *G09G 2320/068* (2013.01); *G09G 2354/00* (2013.01)

(58) Field of Classification Search
CPC ... G02F 2001/134345; G02F 2201/121; G02F 2201/123; G02F 1/1323; G06F 3/0412; G06F 3/0416; G06F 3/044; G09G 3/3696; G09G 2320/068; G09G 2354/00; G09G 3/3655; G09G 3/36
See application file for complete search history.

(56) References Cited

U.S. PATENT DOCUMENTS

| | | | | |
|---|---|---|---|---|
| 2006/0146250 | A1* | 7/2006 | Wu | G02F 1/1343 349/141 |
| 2007/0046881 | A1* | 3/2007 | Takei | G02F 1/1323 349/139 |
| 2007/0252801 | A1* | 11/2007 | Park | G09G 3/3607 345/88 |
| 2008/0272995 | A1* | 11/2008 | Sakaguchi | G06F 1/1637 345/87 |
| 2010/0128189 | A1* | 5/2010 | Teranishi | G02F 1/1323 349/33 |
| 2010/0321311 | A1* | 12/2010 | Chang | G06F 3/044 345/173 |
| 2011/0025675 | A1 | 2/2011 | Peng et al. | |
| 2014/0062943 | A1* | 3/2014 | Choi | G06F 3/0446 345/174 |
| 2016/0147331 | A1* | 5/2016 | Qin | G06F 3/0412 345/174 |
| 2016/0187731 | A1* | 6/2016 | Li | G02F 1/133753 349/129 |
| 2016/0341987 | A1* | 11/2016 | Chung | G02F 1/1323 |
| 2017/0059898 | A1* | 3/2017 | Su | G02F 1/134363 |
| 2017/0192263 | A1* | 7/2017 | Jiang | G02F 1/1323 |
| 2019/0102007 | A1* | 4/2019 | Ito | G06F 3/0412 |
| 2019/0155440 | A1* | 5/2019 | Ito | G09G 3/20 |

FOREIGN PATENT DOCUMENTS

| | | |
|---|---|---|
| CN | 105425480 A | 3/2016 |
| CN | 106597698 A | 4/2017 |
| CN | 106773191 A | 5/2017 |
| CN | 206892487 U | 1/2018 |

\* cited by examiner

DISPLAY PANEL, DISPLAY APPARATUS AND CONTROL METHOD THEREOF

CROSS-REFERENCE TO RELATED APPLICATION

This application claims priority to Chinese Patent Application No. 201810556019.2, filed on Jun. 1, 2018, titled "A DISPLAY PANEL, DISPLAY APPARATUS AND CONTROL METHOD THEREOF", which is incorporated herein by reference in its entirety.

TECHNICAL FIELD

The present disclosure relates to the field of display technologies, and in particular, to a display panel, a display apparatus and a control method thereof.

BACKGROUND

With the development of display technologies, electronic devices with touch functions are increasingly favored by consumers. Users can control the electronic devices by touching display screens of the electronic devices.

SUMMARY

In a first aspect, a display panel is provided. The display panel includes a first substrate, a second substrate, and a liquid crystal layer. The first substrate includes a first common electrode layer and a pixel electrode layer. The first common electrode layer is configured to receive a first common voltage signal to form a first electric field with the pixel electrode layer. The second substrate is disposed opposite to the first substrate, and includes a second common electrode layer. The second common electrode layer is configured to receive a second common voltage signal to form a second electric field with the pixel electrode layer. The liquid crystal layer is disposed between the first substrate and the second substrate.

In some embodiments, the display panel has sub-pixel regions. The second common electrode layer is selected from a group consisting of: a second common electrode layer including a first plate-shaped electrode, a second common electrode layer including strip-shaped electrodes, a second common electrode layer including block-shaped electrodes each of which is located in a corresponding sub-pixel region, and a second common electrode layer including slit electrodes each of which is located in a corresponding sub-pixel region.

In some embodiments, the display panel has sub-pixel regions. The first common electrode layer is disposed at a side of the pixel electrode layer facing away from the second common electrode layer. The first common electrode layer is selected from a group consisting of: a first common electrode layer including a second plate-shaped electrode, a first common electrode layer including strip-shaped electrodes, a first common electrode layer including block-shaped electrodes each of which is located in a corresponding sub-pixel region, and a first common electrode layer including slit electrodes each of which is located in a corresponding sub-pixel region. The pixel electrode layer includes slit electrodes each of which is located in a corresponding sub-pixel region.

In some embodiments, the display panel has sub-pixel regions. The pixel electrode layer is disposed at a side of the first common electrode layer facing away from the second common electrode layer. The pixel electrode layer is selected from a group consisting of: a pixel electrode layer including block-shaped electrodes each of which is located in a corresponding sub-pixel region, and a pixel electrode layer including slit electrodes each of which is located in a corresponding sub-pixel region. The first common electrode layer includes slit electrodes each of which is located in a corresponding sub-pixel region.

In some embodiments, the display panel has sub-pixel regions. The first common electrode layer and the pixel electrode layer are disposed in a same layer. The pixel electrode layer includes first comb electrodes, and each first comb electrode is located in a corresponding sub-pixel region. The first common electrode layer includes second comb electrodes, and each second comb electrode is located in a corresponding sub-pixel region. Teeth of first and second comb electrodes that are located in a same sub-pixel region are alternately arranged and spaced apart.

In some embodiments, the first substrate further includes a first base substrate and a touch layer. The first common electrode layer and the pixel electrode layer are disposed at a side of the first base substrate facing the liquid crystal layer. The touch layer is disposed at a side of the first base substrate facing away from the liquid crystal layer.

In some embodiments, the first substrate further includes a first base substrate and a touch layer. The first common electrode layer and the pixel electrode layer are disposed at a side of the first base substrate facing the liquid crystal layer. The touch layer is disposed between the first base substrate and one of the first common electrode layer and the pixel electrode layer closer to the first base substrate.

In some embodiments, the second substrate further includes a second base substrate and a touch layer. The second common electrode layer is disposed on a side of the second base substrate facing the liquid crystal layer. The touch layer is disposed on a side of the second base substrate facing away from the liquid crystal layer.

In some embodiments, the second substrate further includes a second base substrate and a touch layer. The second common electrode layer is disposed on a side of the second base substrate facing the liquid crystal layer. The touch layer is disposed between the second base substrate and the second common electrode layer.

In some embodiments, the display panel has sub-pixel regions. The first substrate further includes a first base substrate and thin film transistors. The first common electrode layer and the pixel electrode layer are disposed at a side of the first base substrate facing the liquid crystal layer. The thin film transistors are disposed on the side of the first base substrate facing the liquid crystal layer. Each thin film transistor is located in a corresponding sub-pixel region, and is electrically connected to a portion of the pixel electrode layer located in the sub-pixel region.

In a second aspect, a display apparatus is provided. The display apparatus includes the display panel according to the first aspect, a controller, and a common voltage generating circuit. The controller is electrically connected to the display panel and is configured to: monitor a usage state of the display panel in real time, generate a first control command in response to the display panel being in a first usage state, and generate a second control command in response to the display panel being in a second usage state. The common voltage generating circuit is electrically connected to the controller and the display panel, and is configured to: generate a first common voltage signal and a second common voltage signal, transfer the first common voltage signal to the first common electrode layer of the display panel in response to receiving the first control command, and transfer the second common voltage signal to the second common electrode layer of the display panel in response to receiving the second control command.

In some embodiments, the common voltage generating circuit includes a main circuit, a first common voltage output terminal, and a second common voltage output terminal. The main circuit is electrically connected to the controller and is configured to: generate a first common voltage signal and a second common voltage signal, transfer the first common voltage signal in response to receiving the first control command, and transfer the second common voltage signal in response to receiving the second control command. The first common voltage output terminal is electrically connected to the main circuit and the first common electrode layer of the display panel, and is configured to transfer the first common voltage signal to the first common electrode layer. The second common voltage output terminal is electrically connected to the main circuit and the second common electrode layer of the display panel, and is configured to transfer the second common voltage signal to the second common electrode layer.

In some embodiments, the common voltage generating circuit includes a logic circuit, a first sub-circuit and a second sub-circuit. The logic circuit is electrically connected to the controller, and the logic circuit is configured to: transfer the first control command to the first sub-circuit in response to receiving the first control command, and transfer the second control command to the second sub-circuit in response to receiving the second control command. The first sub-circuit is electrically connected to the logic circuit and the first common electrode layer of the display panel and is configured to: generate a first common voltage signal, and transfer the first common voltage signal to the first common electrode layer of the display panel in response to receiving the first control command. The second sub-circuit is electrically connected to the logic circuit and the second common electrode layer of the display panel and is configured to: generate a second common voltage signal, and transfer the second common voltage signal to the second common electrode layer of the display panel in response to receiving the second control command.

In a third aspect, a control method of a display apparatus is provided. The control method is used for controlling the display apparatus according to the second aspect. The control method includes: monitoring a usage state of the display apparatus in real time, and determining whether the display apparatus is in a first usage state or in a second usage state; in response to determining that the display apparatus is in the first usage state, outputting a first common voltage signal to the first common electrode layer of the display apparatus, so that the display apparatus enters a wide viewing angle display mode; and in response to determining that the display apparatus is in the second usage state, outputting a second common voltage signal to the second common electrode layer of the display apparatus, so that the display apparatus enters a narrow viewing angle display mode.

In some embodiments, the step of monitoring a usage state of the display apparatus in real time, and determining whether the display apparatus is in a first usage state or in a second usage state, includes: monitoring whether there is a touch signal in the display apparatus; if there is a touch signal at a current moment, determining that the display apparatus is in the second usage state at the current moment; and if there is no touch signal at a current moment, determining whether there is a touch signal at moments in a pre-set continuous time period before the current moment; if there is no touch signal at moments in a pre-set continuous time period before the current moment, determining that the display apparatus is in the first usage state at the current moment; if there are touch signal(s) at moments in a pre-set continuous time period before the current moment, monitoring whether there is a touch signal in the display apparatus at a next moment. The pre-set continuous time period is a continuous time period between a start point and an end point, with the start point being a certain moment before the current moment and the end point being the current moment.

In some embodiments, the pre-set continuous period is 2 to 5 minutes.

In a fourth aspect, a non-transitory computer-readable storage medium is provided. The non-transitory computer-readable storage medium stores executable instructions that, when executed by a display apparatus, cause the display apparatus to perform the control method of the display apparatus according to the third aspect.

BRIEF DESCRIPTION OF THE DRAWINGS

In order to describe technical solutions in some embodiments of the present disclosure more clearly, the accompanying drawings to be used in some embodiments of the present disclosure will be introduced briefly. Obviously, the accompanying drawings to be described below are merely some embodiments of the present disclosure, and a person of ordinary skill in the art can obtain other drawings according to these drawings without paying any creative effort.

DETAILED DESCRIPTION

Figure 1:
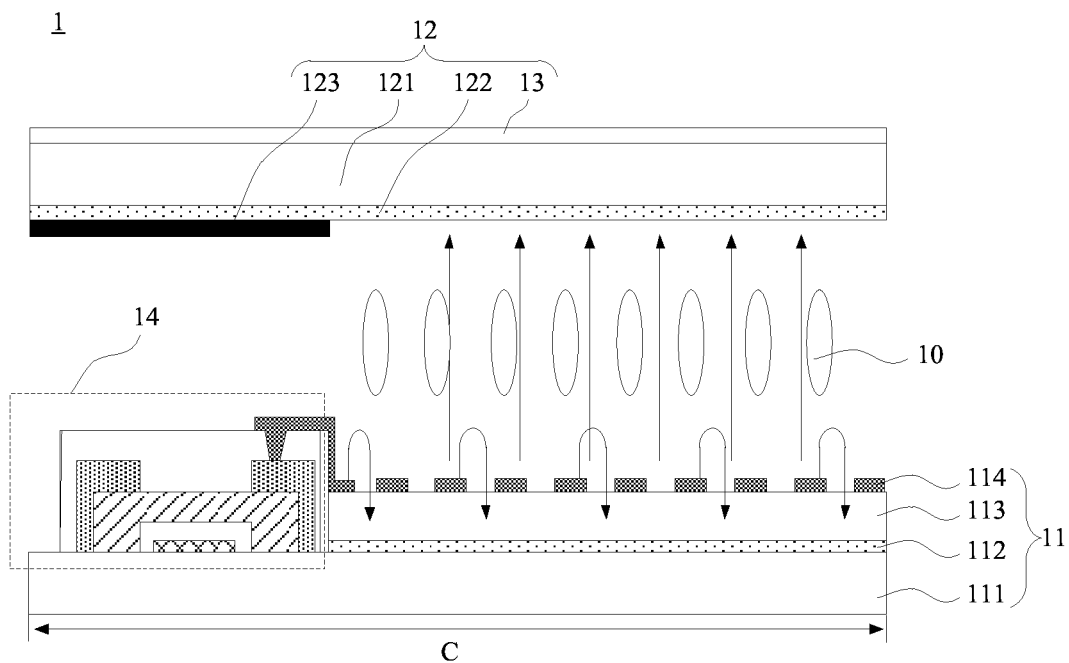
FIG. 1 is a schematic diagram showing a partial structure of a display panel, in accordance with some embodiments.

The technical solutions in some embodiments of the present disclosure will be described clearly and completely with reference to the accompanying drawings in some embodiments of the present disclosure. Obviously, the described embodiments are merely some but not all of embodiments of the present disclosure. All other embodiments made on the basis of the embodiments of the present disclosure by a person of ordinary skill in the art shall be included in the protection scope of the present disclosure.

The terms "first" and "second" are used for descriptive purposes only and are not to be construed as indicating or implying the relative importance or implicitly indicating the number of indicated technical features below. Thus, features defined as "first", "second" may explicitly or implicitly include one or more of the features. In the description of some embodiments of the present disclosure, "a plurality of" means two or more unless otherwise specified. Orientations or positional relationships indicated by terms "upper/above", "lower/below", etc. are based on orientations or positional relationships shown in the accompanying drawings, merely for the convenience of explaining simplified descriptions of the technical solutions of some embodiments the present disclosure, but not to indicate or imply that the referred devices or elements must have a particular orientation, or must be constructed or operated in a particular orientation. Therefore they should not be construed as limitations to the present disclosure.

Throughout the text, the term "first plate-shaped electrode" refers to a whole layer of electrode in which no openings are provided. The term "second plate-shaped electrode" refers to a whole layer of electrode in which openings are provided. The term "block-shaped electrodes" refers to electrodes each in the form of a block, and these electrodes may be arranged in an array. The term "strip-shaped electrodes" refers to electrodes each in the form of a strip, and these electrodes are arranged in parallel and spaced apart. The term "slit electrode" refers to an electrode in which slits are provided, and the slits are arranged in parallel and spaced apart. The term "comb electrode" refers to an electrode formed by connecting ends of a plurality of parallel and spaced strip-shaped electrodes on the same side.

A display screen is an interactive interface of a user terminal. Users demand that the display screen can better protect privacy in certain usage scenarios. However, users also require that the display screen have excellent display performance in some usage scenarios. Users require different viewing angles depending on whether they need to share the content displayed on the display screen and whether the displayed information is confidential. Therefore, a display device with a single viewing angle mode may not meet the above requirements of users. For example, when paying, talking with colleagues, and chatting with family members in public with an electronic device, the user may want the display screen to have a narrow viewing angle, so that a visible range of the display is reduced. Therefore, the purpose of protecting individual privacy and company secrets is achieved. However, when sharing or showing the content on the display screen to viewers, friends, and colleagues, the user may desire that the display screen have a wide viewing angle, so as to obtain a good display effect.

For this purpose, some embodiments of the present disclosure provide a display panel 1. As shown in FIG. 1, the display panel 1 includes a first substrate 11, a second substrate 12 disposed opposite to the first substrate 11, and a liquid crystal layer 10 disposed between the first substrate 11 and the second substrate 12.

The first substrate 11 includes a first common electrode layer 112 and a pixel electrode layer 114. The first common electrode layer 112 is configured to receive a first common voltage signal to form a first electric field with the pixel electrode layer 114.

The second substrate 12 includes a second common electrode layer 122. The second common electrode layer 122 is configured to receive a second common voltage signal to form a second electric field with the pixel electrode layer 114.

The liquid crystal layer 10 of the display panel 1 may be driven by the first electric field formed by the first common electrode layer 112 and the pixel electrode layer 114, or may be driven by the second electric field formed by the second common electrode layer 122 and the pixel electrode layer 114. At a same moment, the pixel electrode layer 114 only forms an electric field with one of the first common electrode layer 112 and the second common electrode layer 122 to drive the liquid crystal layer 10 of the display panel 1. Therefore, in a case where the first common electrode layer 112 receives the first common voltage signal, the second common electrode layer 122 does not receive the second common voltage signal. Similarly, in a case where the second common electrode layer 122 receives the second common voltage signal, the first common electrode layer 112 does not receive the first common voltage signal.

Based on this, in a display process, only one of the first common electrode layer 112 and the second common electrode layer 122 receives a common voltage signal. The first common electrode layer 112 and the second common electrode layer 122 are, for example, electrically connected to two common voltage terminals respectively, and common voltage signals will not be input via the two common voltage terminals at a same time.

In the above embodiments, since the liquid crystal layer 10 is disposed between the first substrate 11 and the second substrate 12, when the second electric field is formed between the pixel electrode layer 114 disposed in the first substrate 11 and the second common electrode layer 122 disposed in the second substrate 12, electric field lines of the second electric field pass through the liquid crystal layer 10. For example, the electric field lines pass through the liquid crystal layer 10 at a vertical angle (or at a nearly vertical angle). That is, a vertical electric field is formed (as indicated by upward arrows in FIG. 1). At this time, liquid crystals in the liquid crystal layer 10 are deflected under an action of the second electric field, causing the display panel 1 to have a narrow viewing angle. The narrow viewing angle of the display panel 1 will reduce a visible range of the display panel 1, thereby protecting user privacy.

The first electric field is formed by the first common electrode layer 112 and the pixel electrode layer 114 that are disposed at a same side of the liquid crystal layer 10. For example, electric field lines of the first electric field may be parallel to (or almost parallel to) the liquid crystal layer 10. That is, a horizontal electric field is formed (as indicated by curved downward arrows in FIG. 1). At this time, tangential directions of electric field lines that are close to the liquid crystal layer 10 and in the liquid crystal layer 10 are parallel to or almost parallel to the liquid crystal layer 10. Liquid crystals in the liquid crystal layer 10 are deflected under an action of the first electric field, causing the display panel 1 to have a wide viewing angle. When the user shows an image on the display panel 1 to others or watches a video on the display panel, the wide viewing angle of the display panel 1 will increase the visible range of the display panel 1, thereby meeting the user's requirements of showing images to others or watching videos with a good display quality.

The above display panel 1 has a narrow viewing angle when the pixel electrode layer 114 and the second common electrode layer 122 form a second electric field, and has a wide viewing angle when the pixel electrode layer 114 and the first common electrode layer 112 form a first electric field. In this way, in a case where privacy is needed, the second common voltage signal is input to the second common electrode layer 122, and the first common voltage signal is not input to the first common electrode layer 112. In a case where a wide viewing angle is needed, the first common voltage signal is input to the first common electrode layer 112, and the second common voltage signal is not input to the second common electrode layer 122. In this way, switching between a narrow viewing angle display mode and a wide viewing angle display mode may be realized. That is to say, in the display panel 1 provided by some embodiments of the present disclosure, the display panel 1 may be switched between the wide viewing angle display mode and the narrow viewing angle display mode by adjusting inputting of the common voltage signals. Therefore, user's requirements for different display modes of the display panel may be met.

For convenience of description, the structure of the display panel will be described below by means of sub-pixel regions. The display panel 1 has sub-pixel regions, each sub-pixel region corresponds to one sub-pixel, and each sub-pixel is configured to emit light of one color. The sub-pixel regions may be arranged in an array. For the sake of simplicity, FIGS. 1-15 only schematically show the structure of a portion of the display panel 1 located in a sub-pixel region C.

The shape of the second common electrode layer 122 will not be limited herein, as long as the second common electrode layer 122 can form an electric field for driving the liquid crystal layer 10 with the pixel electrode layer 114. In some embodiments, as shown in FIGS. 1 to 5, the second common electrode layer 122 includes a first plate-shaped electrode. In this way, a patterning process may not be needed to be performed for the second common electrode layer 122, thereby simplifying a manufacturing process of the second common electrode layer 122.

In some other embodiments, the second common electrode layer 122 includes strip-shaped electrodes, and each strip-shaped electrode may correspond to some of the sub-pixel regions of the display panel in an extending direction of the strip-shaped electrode.

Figure 6:
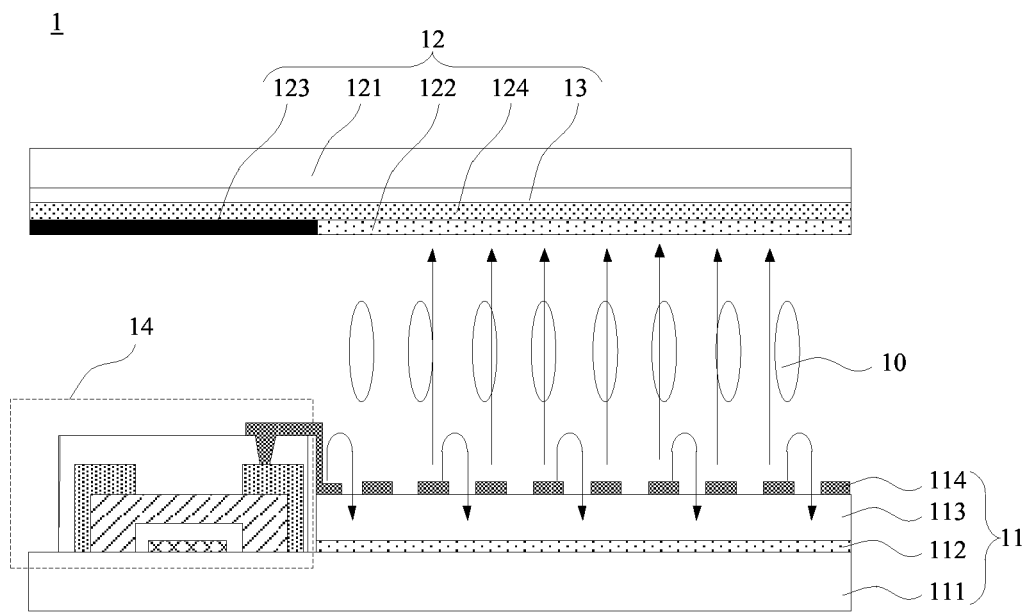
FIG. 6 is a schematic diagram showing a partial structure of yet another display panel, in accordance with some embodiments.

In some other embodiments, as shown in FIG. 6, the second common electrode layer 122 includes block-shaped electrodes, and each block-shaped electrode is located in a corresponding sub-pixel region. In some examples, the block-shaped electrodes are connected together. In some other examples, the block-shaped electrodes are electrically insulated from each other. In some other examples, some of the block-shaped electrodes are electrically insulated from each other, and remaining block-shaped electrodes are connected together.

Figure 7:
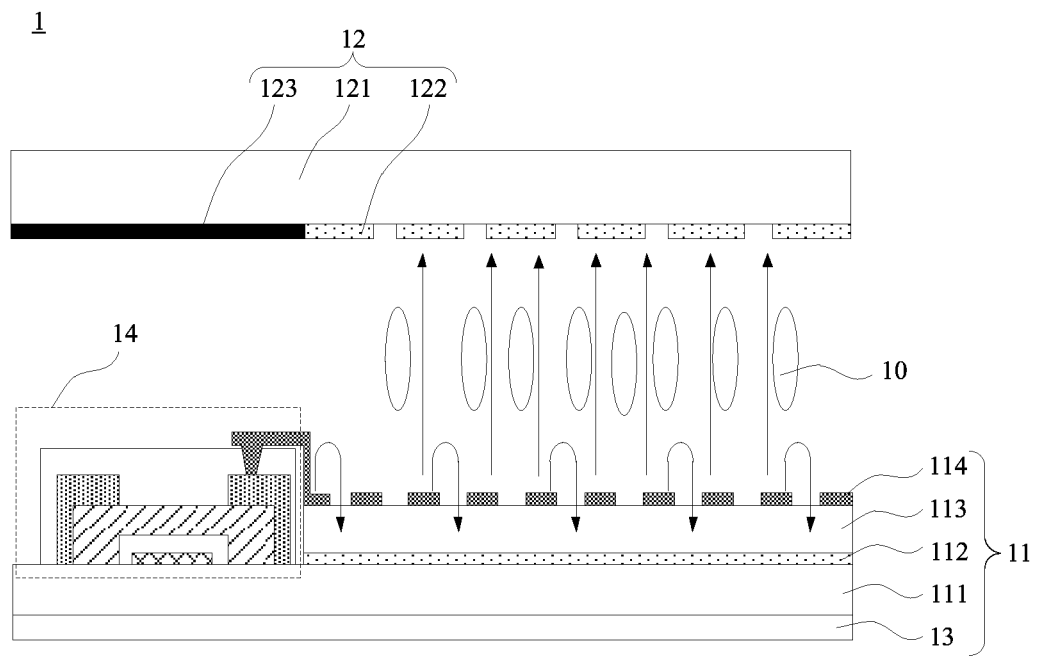
FIG. 7 is a schematic diagram showing a partial structure of yet another display panel, in accordance with some embodiments.
Figure 8:
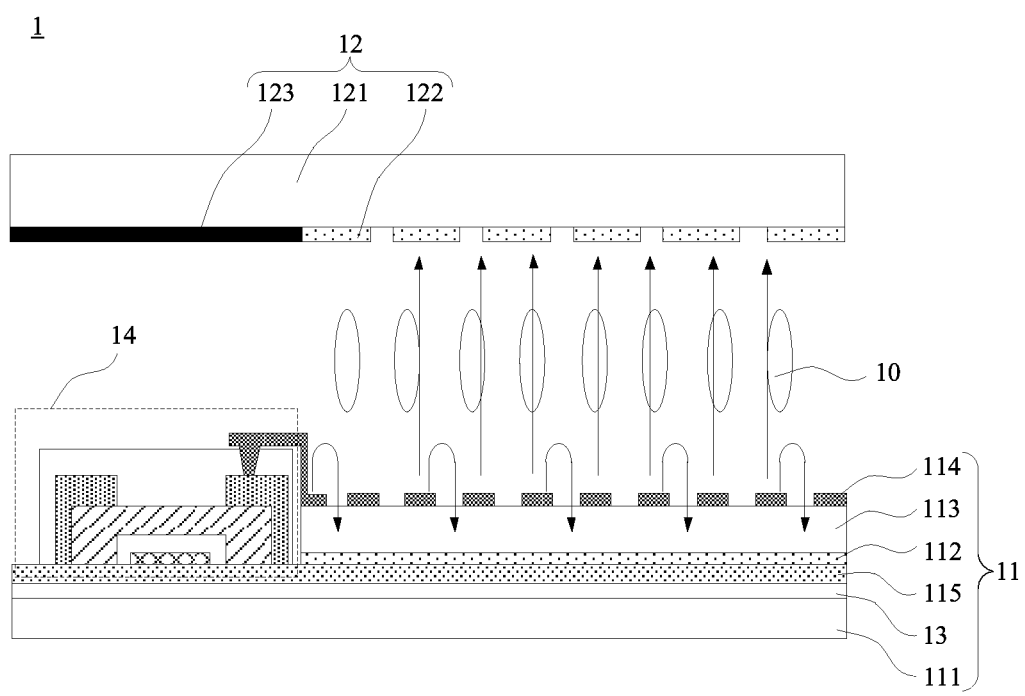
FIG. 8 is a schematic diagram showing a partial structure of yet another display panel, in accordance with some embodiments.

In some other embodiments, as shown in FIGS. 7 and 8, the second common electrode 122 includes slit electrodes, and each silt electrode is located in a corresponding sub-pixel region. In some examples, the slit electrodes are connected together. In some other examples, the slit electrodes are electrically insulated from each other. In some other examples, some of the slit electrodes are electrically insulated from each other, and remaining slit electrodes are connected together.

The positions and structures of the first common electrode layer 112 and the pixel electrode layer 114 in embodiments of the present disclosure are described below.

In some embodiments, as shown in FIG. 1, the first common electrode layer 112 is disposed at a side of the pixel electrode layer 114 facing away from the second common electrode layer 122. The first common electrode layer 112 includes a second plate-shaped electrode, and the second plate-shaped electrode has openings each of which is located in a corresponding sub-pixel region. The openings are in a one-to-one correspondence with thin film transistors 14 included in the first substrate 11, and the thin film transistors 14 will be described below. The pixel electrode layer 114 includes slits electrodes, each of which is located in a corresponding sub-pixel region.

In some other embodiments, the first common electrode layer 112 is disposed at a side of the pixel electrode layer 114 facing away from the second common electrode layer 122. The first common electrode layer 112 includes strip-shaped electrodes, and each strip-shaped electrode may correspond to some of the sub-pixel regions of the display panel in an extending direction of the strip-shaped electrode. The pixel electrode layer 114 includes slit electrodes, and each slit electrode is located in a corresponding sub-pixel region. Extending directions of the strip-shaped electrodes and slits of the slit electrodes are the same.

In some other embodiments, the first common electrode layer 112 is disposed at a side of the pixel electrode layer 114 facing away from the second common electrode layer 122. The first common electrode layer 112 includes block-shaped electrodes, and each block-shaped electrode is located in a corresponding sub-pixel region. The pixel electrode layer 114 includes slit electrodes, and each slit electrode is located in a corresponding sub-pixel region.

Figure 2:
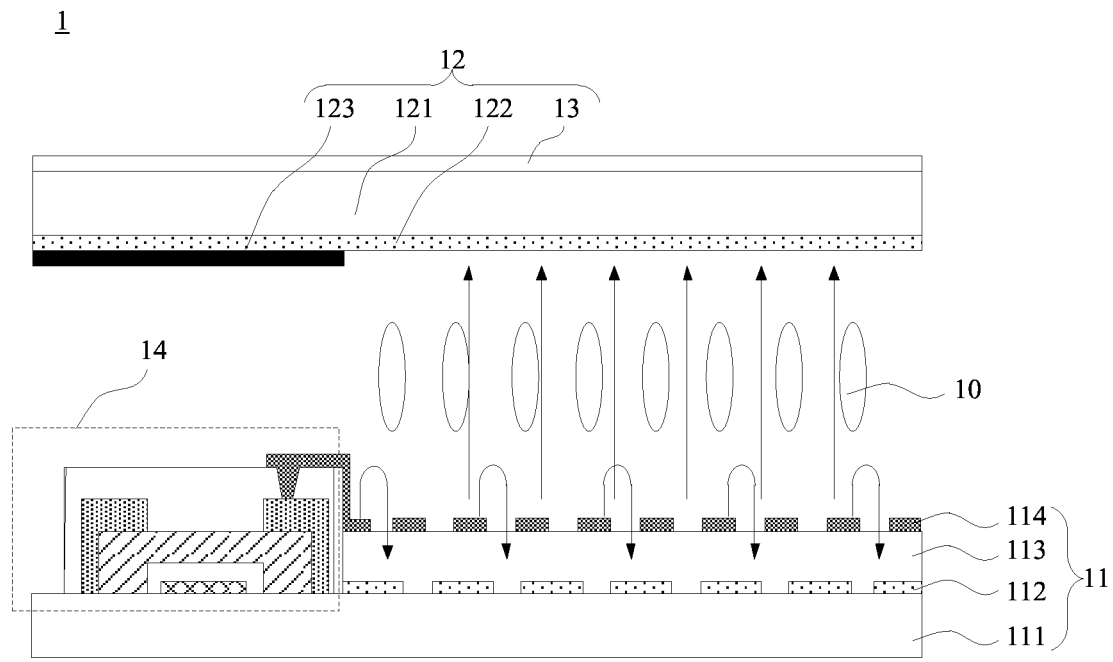
FIG. 2 is a schematic diagram showing a partial structure of another display panel, in accordance with some embodiments.

In some other embodiments, as shown in FIG. 2, the first common electrode layer 112 is disposed at a side of the pixel electrode layer 114 facing away from the second common electrode layer 122. The first common electrode layer 112 includes slit electrodes, each of which is located in a corresponding sub-pixel region. The pixel electrode layer 114 includes slit electrodes, each of which is located in a corresponding sub-pixel region. Slits of the slit electrodes included in the first common electrode layer 112 and slits of the slit electrodes included in the pixel electrode layer 114 have the same extending direction, and may have different sizes or the same size.

Since the first common electrode layer 112 and the pixel electrode layer 114 are disposed in different layers, in order to electrically insulate the first common electrode layer 112 and the pixel electrode layer 114 from each other, in some embodiments, as shown in FIGS. 1 and 2, the first substrate 11 further includes a first insulating layer 113 disposed between the first common electrode layer 112 and the pixel electrode layer 114.

Figure 3:
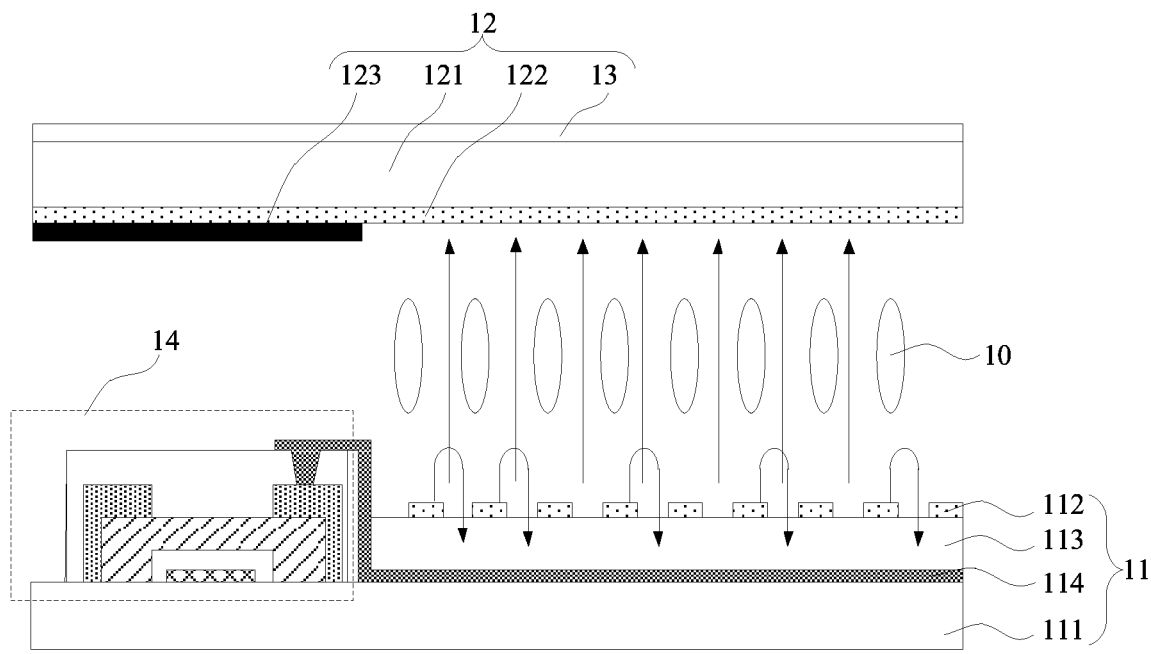
FIG. 3 is a schematic diagram showing a partial structure of yet another display panel, in accordance with some embodiments.

Positions of the first common electrode layer 112 and the pixel electrode layer 114 are interchangeable. In some embodiments, as shown in FIG. 3, the pixel electrode layer 114 is disposed at a side of the first common electrode layer 112 facing away from the second common electrode layer 122. The pixel electrode layer 114 includes block-shaped electrodes, and each block-shaped electrode is located in a corresponding sub-pixel region. The first common electrode layer 112 includes slit electrodes, and each slit electrode is located in a corresponding sub-pixel region.

Figure 4:
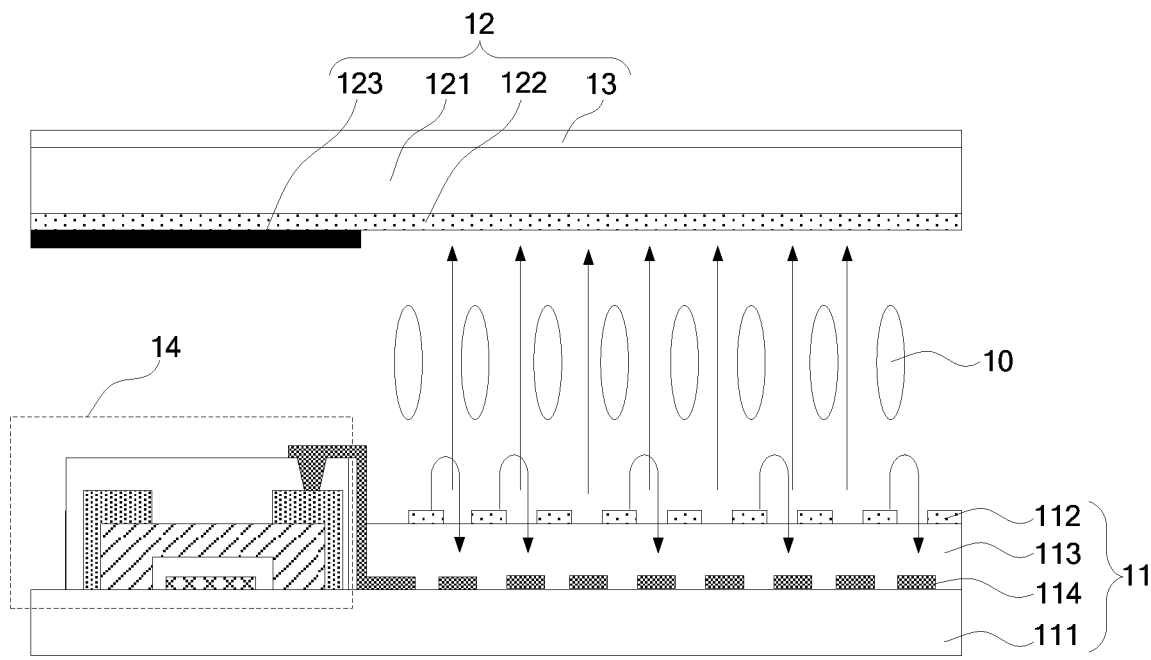
FIG. 4 is a schematic diagram showing a partial structure of yet another display panel, in accordance with some embodiments.

In some other embodiments, as shown in FIG. 4, the pixel electrode layer 114 is disposed at a side of the first common electrode layer 112 facing away from the second common electrode layer 122. The pixel electrode layer 114 includes slit electrodes, and each of which is located in a corresponding sub-pixel region. The first common electrode layer 112 includes slit electrodes, each of which is located in a corresponding sub-pixel region. Slits of the slit electrodes included in the first common electrode layer 112 and slits of the slit electrodes included in the pixel electrode layer 114 have the same extending direction, and may have different sizes or the same size.

Figure 5:
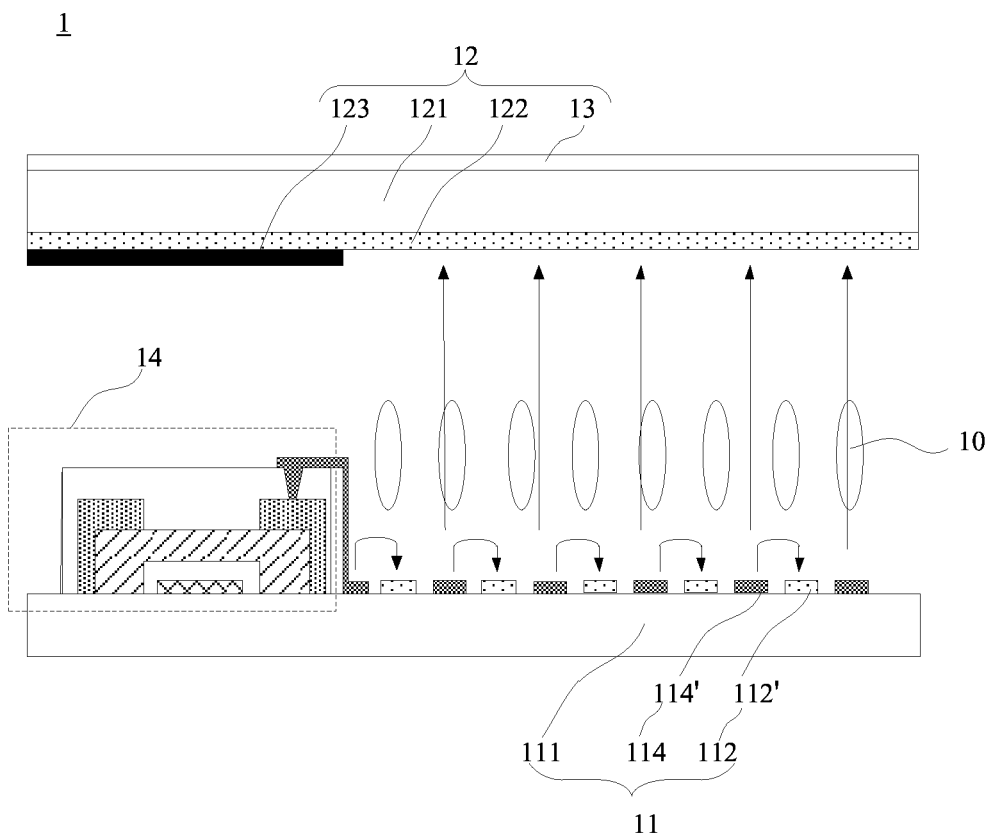
FIG. 5 is a schematic diagram showing a partial structure of yet another display panel, in accordance with some embodiments.

In some other embodiments, as shown in FIG. 5, the first common electrode layer 112 and the pixel electrode layer 114 are disposed in a same layer. The pixel electrode layer 114 includes first comb electrodes 114', and each first comb electrode 114' is located in a corresponding sub-pixel region. The first common electrode layer 112 includes second comb electrodes 112', and each second comb electrode 112' is located in a corresponding sub-pixel region. Teeth of a first comb electrode 114' and a second strip-shaped electrode 112' that are located in a same sub-pixel region are alternately arranged and spaced apart.

The description that "teeth of a first comb electrode 114' and a second strip-shaped electrode 112' that are located in a same sub-pixel region are alternately disposed and spaced apart" means that: one tooth of the second tomb electrode 112' is disposed between two adjacent ones of the teeth of the first tomb electrodes 114'; or, one tooth of the first tomb electrode 114' is disposed between two adjacent ones of the teeth of the second tomb electrode 112'. Based on this, the first common electrode layer 112 and the pixel electrode layer 114 may be formed synchronously. In this way, a manufacturing process of the display panel may be simplified, thereby improving production efficiency.

The present disclosure does not limit a positional relationship between the first common electrode layer 112 and the pixel electrode layer 114, as long as the first electric field can be formed so that the display panel 1 has a wide viewing angle.

In some embodiments, the first common electrode layer 112, the second common electrode layer 122 and the pixel electrode layer 114 are all transparent electrodes.

Based on the above embodiments, in some embodiments, as shown in FIGS. 1 and 2, the first substrate 11 further includes a first base substrate 111 and thin film transistors (TFTs) 14. The first common electrode layer 112 and the pixel electrode layer 114 are disposed at a side of the first base substrate 111 facing the liquid crystal layer 10, and the TFTs 14 are disposed at the side of the first base substrate 111 facing the liquid crystal layer 10. Each TFT is located in a corresponding sub-pixel region, and is electrically connected to a corresponding portion of the pixel electrode layer 114 located in the sub-pixel region. For example, a TFT and a block-shaped electrode of the pixel electrode layer 114 are located in a same sub-pixel region. The TFT is electrically connected to the block-shaped electrode, and is configured to drive the block-shaped electrode.

In some embodiments, as shown in FIGS. 1 and 2, the second substrate 12 further includes a second base substrate 121, and the second common electrode layer 122 is disposed on a side of the second base substrate 121 facing the liquid crystal layer 10. The second substrate 12 further includes a black matrix 123. In some examples, as shown in FIGS. 1-5, the second common electrode layer 122 includes a first plate-shaped electrode, and the black matrix 123 is disposed at side of the second common electrode layer 122 facing away from the second base substrate 121. In some other examples, as shown in FIG. 6, the second common electrode layer 122 includes block-shaped electrodes, or as shown in FIGS. 7 and 8, the second common electrode layer 122 includes strip-shaped electrodes or slit electrodes. The black matrix 123 and the block-shaped electrodes (or the strip-shaped electrodes, or the slit electrodes) are disposed in a same layer. The black matrix 123 has a grid-like structure, and an orthographic projection of spacing regions, each of which is disposed between two adjacent sub-pixel regions of the display panel 1, on the second base substrate 121 is within a range of an orthographic projection of the black matrix 123 on the second base substrate 121. In this way, the black matrix 123 may block spacing regions each between two adjacent sub-pixel regions, so as to prevent light leakage of the display panel.

In some embodiments, the display panel 1 further includes a touch layer 13. In some examples, as shown in FIG. 7, the first common electrode layer 112 and the pixel electrode layer 114 are disposed at a same side of the first base substrate 111 facing the liquid crystal layer 10. The touch layer 13 is disposed at a side of the first base substrate 111 facing away from the liquid crystal layer 10.

In some other examples, as shown in FIG. 8, the touch layer 13 is disposed at a side of the first base substrate 111 facing the liquid crystal layer 10, and the touch layer 13 is disposed between the first base substrate 111 and one of the first common electrode layer 112 and the pixel electrode layer 114 closer to the first base substrate 111. It will be noted that in order to avoid crosstalk between electrical signals on the touch layer 13 and electrical signals on one of the first common electrode layer 112 and the pixel electrode layer 114 closer to the touch layer 13, the display panel 1 further includes a second insulating layer 115 disposed between the touch layer 13 and one of the first common electrode layer 112 and the pixel electrode layer 114 closer to the touch layer 13.

In some examples, the touch layer 13 is disposed in the second substrate 12. In some examples, as shown in FIGS. 1-5, the second common electrode layer 122 is disposed on a side of the second base substrate 121 facing the liquid crystal layer 10, and the touch layer 13 is disposed at a side of the second base substrate 121 facing away from the liquid crystal layer 10.

In some other examples, as shown in FIG. 6, the touch layer 13 is disposed at a side of the second base substrate 121 facing the liquid crystal layer 10, and the touch layer 13 is disposed between the second base substrate 121 and the second common electrode layer 122. It will be noted that in order to avoid crosstalk between electrical signals on the second common electrode layer 122 and electrical signals on the touch layer 13, the display panel 1 further includes a third insulating layer 124 disposed between the second common electrode layer 122 and the touch layer 13.

It will be noted that the position of the touch layer 13 is not limited herein, as long as the touch layer 13 can sense the touch on the display panel 1. The touch layer 13 may realize sensing by using the self-capacitance principle, or by using the mutual-capacitance principle.

Based on this, the display panel 1 realizes a touch function through the touch layer 13. The user may communicate a need for a wide viewing angle or a narrow viewing angle to the controller of the display panel 1 by touching the display panel 1, so as to cause the display panel 1 to switch between the wide viewing angle and the narrow viewing angle to enter a viewing angle mode required by the user.

Figure 9:
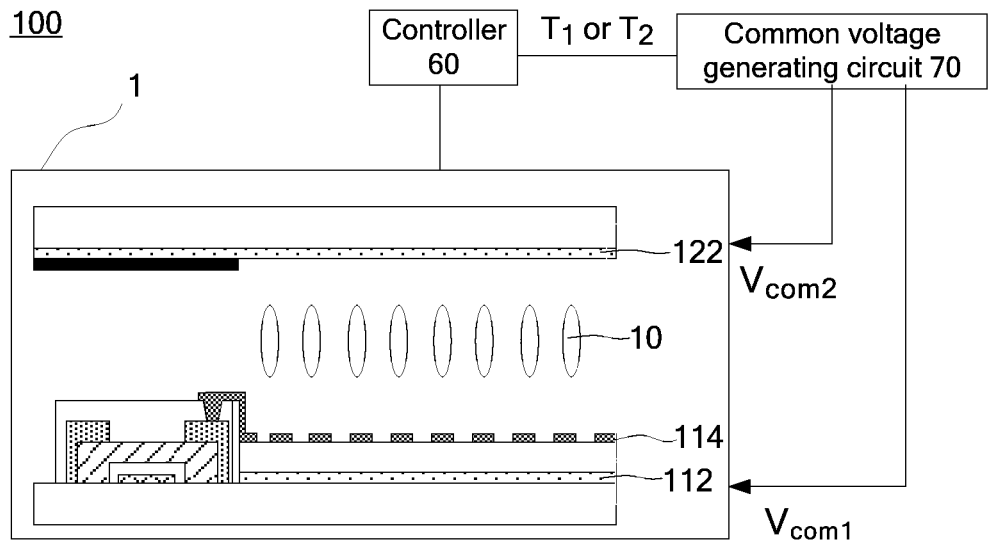
FIG. 9 is a schematic diagram showing a partial structure of a display apparatus, in accordance with some embodiments.

Some embodiments of the present disclosure provide a display apparatus 100. As shown in FIG. 9, the display apparatus 100 includes a display panel 1, a controller 60, and a common voltage generating circuit 70.

The display panel 1 is the display panel described in the above embodiments.

The controller 60 is electrically connected to the display panel 1 and is configured to: monitor a usage state of the display panel 1 in real time; generate a first control command $T_1$ in response to the display panel 1 being in a first usage state; and generate a second control command $T_2$ in response to the display panel 1 being in a second usage state.

The common voltage generating circuit 70 is electrically connected to the controller 60 and the display panel 1, and is configured to: generate a first common voltage signal $V_{com1}$ and a second common voltage signal $V_{com2}$; transfer the first common voltage signal $V_{com1}$ to the first common electrode layer 112 of the display panel 1 in response to receiving first control command $T_1$; and transfer the second common voltage signal $V_{com2}$ to the second common electrode layer 122 of the display panel 1 in response to receiving the second control command $T_2$.

The above controller 60 is, for example, a micro-controller unit (MCU). The MCU includes a detection device for monitoring the usage state of the display panel 1 in real time. For example, the display panel 1 is a touch display panel, and the detection device is a detect touch sensor pin (DTSP) provided in the MCU. The detect touch sensor pin is used for detecting touch signals in the display panel 1.

Since the controller 60 is configured to output different control commands to the common voltage generating circuit 70 according to different usage states of the display panel, in some embodiments, the controller 60 further includes a port electrically connected to the common voltage generating circuit 70, and the port is used for transferring control commands to the common voltage generating circuit 70.

For example, the first usage state is a usage state in which a sharing is needed (for example, when sharing pictures to others, watching videos, etc.), while the second usage state is a usage state in which privacy is needed. A manner in which the usage state of the display panel 1 is monitored is not limited herein. For example, it is determined by gravity sensing whether the display apparatus 100 is in the first usage state or in the second usage state. Of course, it is also possible to monitor whether the display apparatus 100 is in the first usage state or in the second usage state by using other signals detectable by the controller 60.

In the display apparatus 100 provided by some embodiments of the present disclosure, the controller 60 monitors whether the display panel 1 is in the first usage state or in the second usage state in real time, and correspondingly generates a first control command $T_1$ or second control command $T_2$, so as to control the common voltage generating circuit 70 through the first control command $T_1$ or the second control command $T_2$.

That is, in a case where the controller 60 detects that the display panel 1 is in the first usage state, the controller 60 will control the common voltage generating circuit 70 to output a first common voltage signal $V_{com1}$ to the first common electrode layer 112 by using a first control command $T_1$ generated by the controller 60. Since the first common electrode layer 112 and the pixel electrode layer 114 are disposed at the same side of the liquid crystal layer 10, a first electric field is formed, thereby causing the display panel 1 to enter the wide viewing angle display mode.

In a case where the controller 60 detects that the display panel 1 is in the second usage state, the controller 60 will control the common voltage generating circuit 70 to output a second common voltage signal $V_{com2}$ to the second common electrode layer 122 by using a second control command $T_2$ generated by the controller 60. Since the second common electrode layer 122 and the pixel electrode layer 114 are disposed at opposite sides of the liquid crystal layer 10, a second electric field is formed, thereby causing the display panel 1 to enter the narrow viewing angle display mode.

In this way, the display apparatus 100 only needs to determine which usage state it is in, and then automatically switch to the required narrow viewing angle display mode or wide viewing angle display mode.

In some embodiments, in a display apparatus 100 having a touch function, the controller 60 is configured to monitor the usage state of the display panel 1 by detecting the touch signals. For example, when the controller 60 detects that there is a touch signal, it indicates that the user is interacting with the display apparatus 100. In this case, the user generally wants privacy. However, if no touch signal is detected in a continuous time period, it indicates that the user has not been interacting with the display apparatus 100 in the continuous time period. In this case, the user may be watching a video on the display apparatus 100. In this case, privacy is not needed, but a wide viewing angle is preferred for a better display effect.

Therefore, the first usage state may be a state in which the display apparatus 100 is being operated (e.g., touched), and the second usage state may be a state in which the display apparatus 100 has not been operated (e.g., touched) in a pre-set continuous time period. The pre-set continuous time period herein may be set according to the user's requirements. For example, the pre-set continuous time period may be 3 minutes.

The structure of the common voltage generating circuit 70 is not limited herein, as long as the common voltage generating circuit 70 can realize functions of generating and transmitting the common voltage signals as described above.

Figure 10:
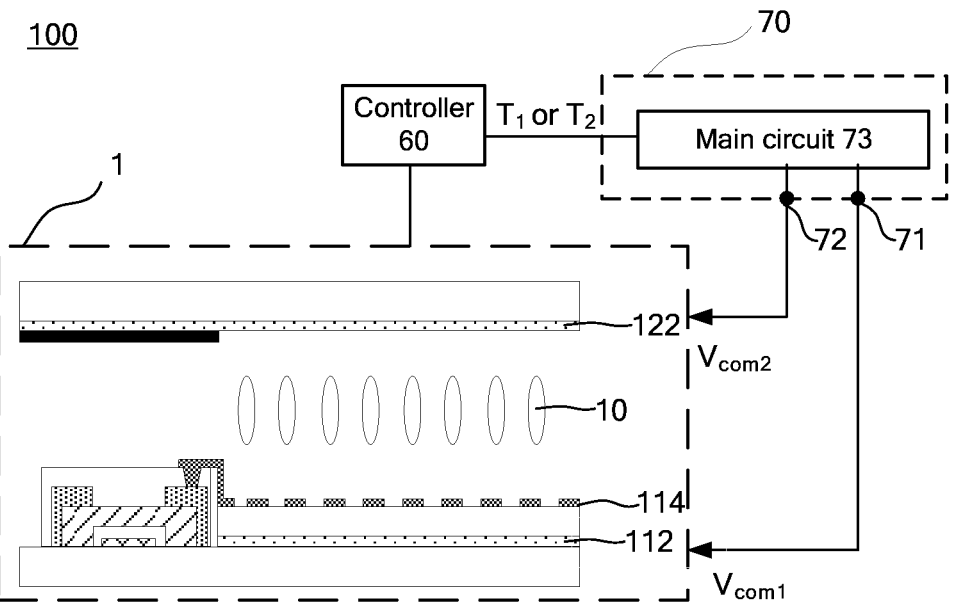
FIG. 10 is a schematic diagram showing a partial structure of another display apparatus, in accordance with some embodiments.

In some embodiments, as shown in FIG. 10, the common voltage generating circuit 70 includes a main circuit 73, a first common voltage output terminal 71, and a second common voltage output terminal 72.

The main circuit 73 is electrically connected to the controller 60 and is configured to: generate a first common voltage signal $V_{com1}$ and a second common voltage signal $V_{com2}$; transfer the first common voltage signal $V_{com1}$ in response to receiving the first control command $T_1$; and transfer the second common voltage signal $V_{com2}$ in response to receiving the second control command $T_2$.

The first common voltage output terminal 71 is electrically connected to the main circuit 73 and the first common electrode layer 112 of the display panel 1, and is configured to transfer the first common voltage signal $V_{com1}$ to the first common electrode layer 112. The second common voltage output terminal 72 is electrically connected to the main circuit 73 and the second common electrode layer 122 of the display panel 1, and is configured to transfer the second common voltage signal $V_{com2}$ to the second common electrode layer 122.

Figure 11:
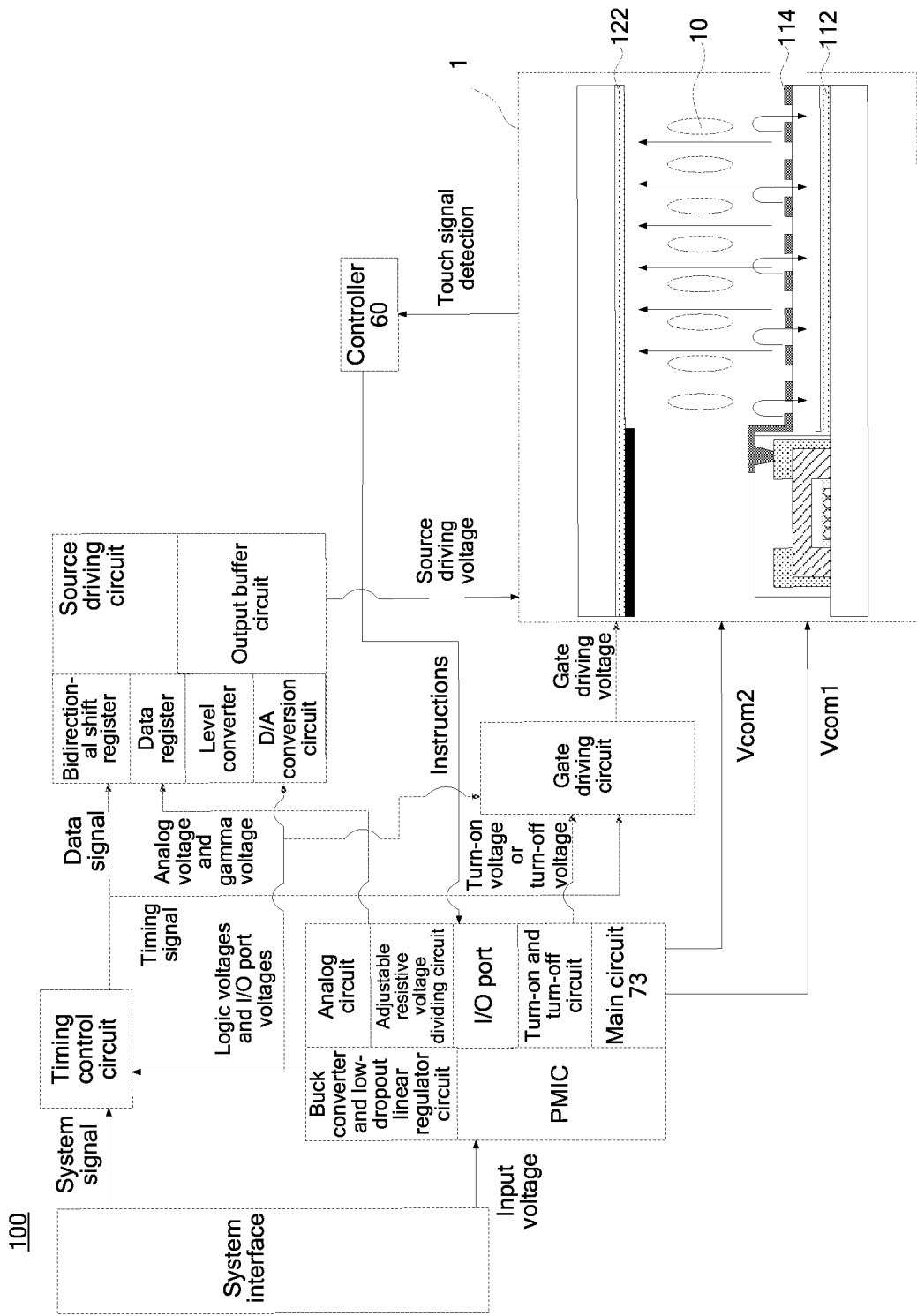
FIG. 11 is a schematic diagram showing a partial structure of yet another display apparatus, in accordance with some embodiments.

Referring to FIG. 11, the main circuit 73, the first common voltage output terminal 71, and the second common voltage output terminal 72 may be integrated in a power management integrated circuit (PMIC) of the display apparatus 100. The function of the main circuit 73 can be realized by a logic circuit and two buck-boost circuits. In addition, the PMIC is provided with an input/output port, for example, a generalpurpose input/output (GPIO) port, that is electrically connected to the controller 60. In this way, the controller 60 is able to output the first control command $T_1$ or the second control command $T_2$ to the PMIC through the input/output port.

PMIC codes are stored in the PMIC (for example, the PMIC codes may be integrated in the main circuit 73 of the PMIC). With the PMIC codes, the PMIC may identify the first control command $T_1$ or the second control command $T_2$, so as to output the first common voltage signal $V_{com1}$ to the first common electrode layer 112 via the first common voltage output terminal 71 in response to receiving the first control command $T_1$, or output the second common voltage signal $V_{com2}$ to the second common electrode layer 122 via the second common voltage output terminal 72 in response to receiving the second control command $T_2$.

In this way, the common voltage signals may be output to the first common electrode layer 112 and the second common electrode layer 122 respectively by using a single PMIC. In this way, cost of printed circuit board (PCB) components may be reduced, thereby reducing the cost of the display apparatus 100.

Figure 12:
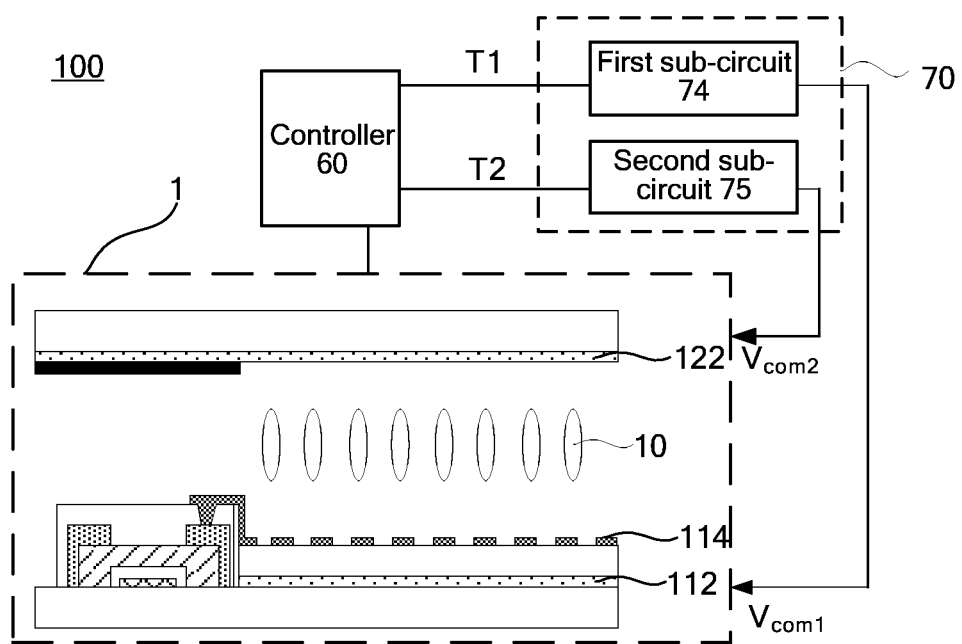
FIG. 12 is a schematic diagram showing a partial structure of yet another display apparatus, in accordance with some embodiments.

In some other embodiments, as shown in FIG. 12, the common voltage generating circuit 70 includes a logic circuit 80, a first sub-circuit 74 and a second sub-circuit 75.

The logic circuit 80 is electrically connected to the controller 60, and is configured to transfer the first control command $T_1$ to the first sub-circuit 74 in response to receiving the first control command $T_1$, and transfer the second control command $T_2$ to the second sub-circuit 75 in response to receiving the second control command $T_2$.

The first sub-circuit 74 is electrically connected to the logic circuit 80 and the first common electrode layer 112 of the display panel 1, and is configured to generate a first common voltage signal $V_{com1}$, and transfer the first common voltage signal $V_{com1}$ to the first common electrode layer 112 of the display panel 1 in response to receiving the first control command $T_1$.

The second sub-circuit 75 is electrically connected to the logic circuit 80 and the second common electrode layer 122 of the display panel 1, and is configured to generate a second common voltage signal $V_{com2}$, and transfer the second common voltage signal $V_{com2}$ to the second common electrode layer 122 of the display panel 1 in response to receiving the second control command $T_2$.

That is to say, the controller 60 is electrically connected to the logic circuit 80, and the logic circuit 80 is electrically connected to the first sub-circuit 74 and the second sub-circuit 75. The first sub-circuit 74 is electrically connected to the first common electrode layer 112, and the second sub-circuit 75 is electrically connected to the second common electrode layer 122. In a case where the controller 60 detects that the display apparatus 100 is in the first usage state, the controller 60 outputs a first control command $T_1$ to the logic circuit 80, and the logic circuit 80 transfers the first control command $T_1$ to the first sub-circuit 74 in response to receiving the first control command $T_1$. The first sub-circuit 74 generates a first common voltage signal $V_{com1}$ in response to receiving the first control command $T_1$, and the first sub-circuit 74 will output a first common voltage signal $V_{com1}$ to the first common electrode layer 112. In a case where the controller 60 detects that the display apparatus 100 is in the second usage state, the controller 60 outputs a second control command $T_2$ to the logic circuit 80, and the logic circuit 80 transfers the second control command $T_2$ to the second sub-circuit 75 in response to receiving the second control command $T_2$. The second sub-circuit 75 generates a second common voltage signal $V_{com2}$ in response to receiving the second control command $T_2$, and the second sub-circuit 75 will output a second common voltage signal $V_{com2}$ to the second common electrode layer 122.

Figure 13:
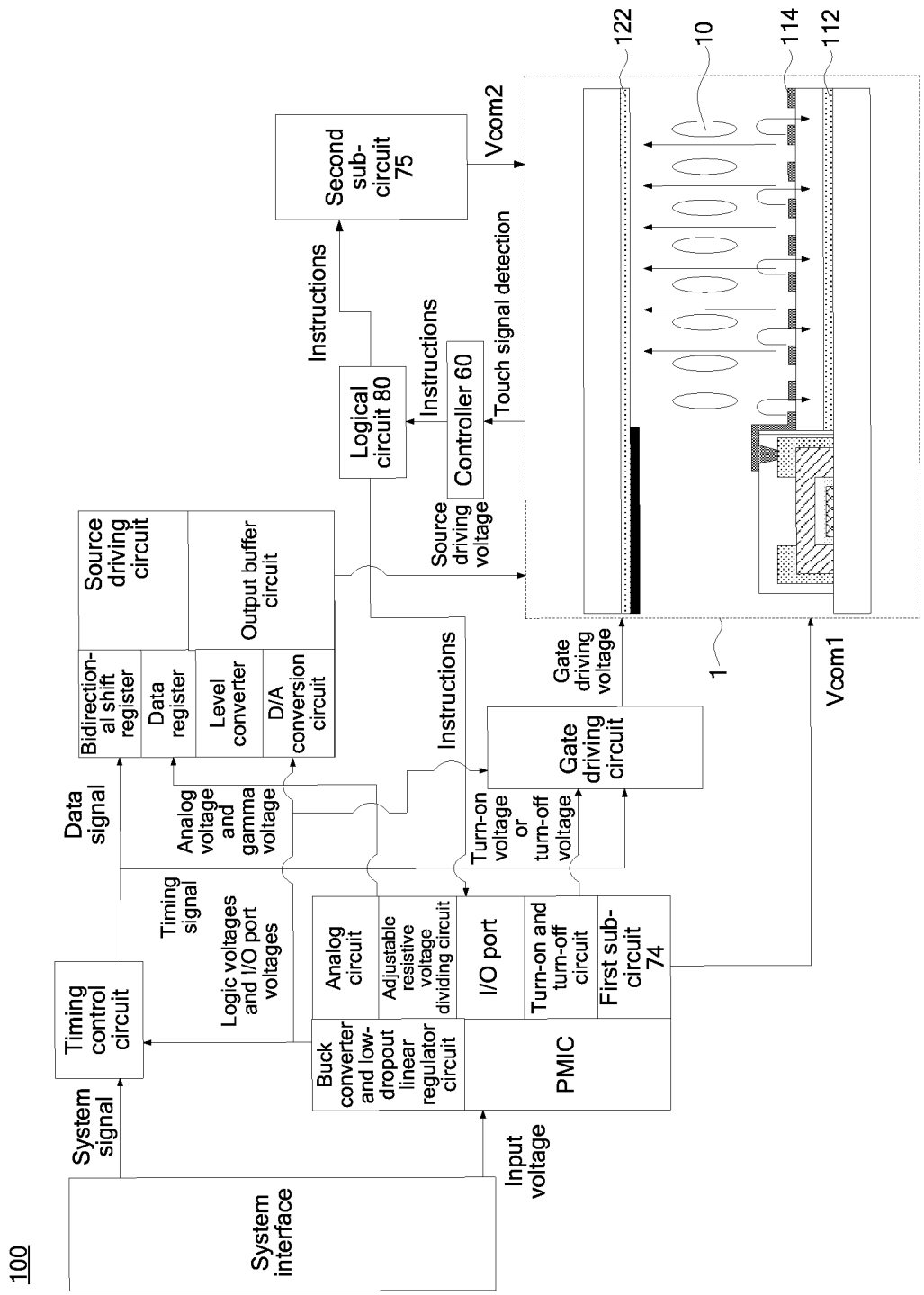
FIG. 13 is a schematic diagram showing a partial structure of yet another display apparatus, in accordance with some embodiments.

As shown in FIG. 13, in some embodiments, in a case where one PMIC includes only one input/output port, the first sub-circuit 74 and the second sub-circuit 75 may be respectively integrated in two PMICs, or, one of the first sub-circuit 74 and the second sub-circuit 75 is integrated in a PMIC, and another is a separate external circuit. The function of the first sub-circuit 74 can be realized by buck-boost circuit(s), and the function of the second sub-circuit 75 can be realized by buck-boost circuit(s). An input/output port provided in the PMIC is electrically connected to the logic circuit 80. In this way, the logic circuit 80 may transfer the first control command $T_1$ to a PMIC integrated with the first sub-circuit 74 through the input/output port, or transfer the second control command $T_2$ to a PMIC integrated with the second sub-circuit 75 through the input/output port.

In some embodiments, as shown in FIGS. 11 and 13, the display apparatus 100 further includes a system interface, a timing control circuit, a source driving circuit, and a gate driving circuit. The system interface is electrically connected to the timing control circuit and the PMIC. The timing control circuit is electrically connected to the display panel 1 through the source driving circuit, and the timing control circuit is electrically connected to the display panel 1 through the gate driving circuit. The PMIC is electrically connected to the timing control circuit, the source driving circuit, and the gate driving circuit.

The source driving circuit includes a bidirectional shift register, a data register, a level converter, a digital-to-analog (D/A) conversion circuit, and an output buffer circuit.

The PMIC further includes a buck converter and low-dropout linear regulator circuit, an analog circuit, an adjustable resistive voltage dividing circuit, and a turn-on and turn-off circuit.

The system interface is configured to receive externally supplied system signals, and transfer the received system signals to the timing control circuit. The system interface is further configured to receive an externally supplied input voltage, and transfer the received input voltage to the PMIC.

The timing control circuit is configured to convert the received system signals into data signals and timing signals, and output the data signals and timing signals.

The bidirectional shift register in the source driving circuit is configured to receive the data signals output by the timing control circuit, rearrange the received data signals, and then temporarily store the rearranged data signals in the data register.

The gate driving circuit is configured to receive the timing signals output by the timing control circuit, voltage modulate the received timing signals to generate gate driving voltages, and output the generated gate driving voltages to the display panel 1.

The buck converter and low-dropout linear regulator circuit in the PMIC is configured to boost or lower the received input voltages to generate logic voltages and I/O port voltages (i.e., voltages at the input/output port), output the generated logic voltages and I/O port voltages as operating voltages to the gate driving circuit and the source driving circuit, and provide power required for operation to the timing control circuit. The analog circuit is configured to input an analog voltage to the data register of the source driving circuit. The adjustable resistive voltage dividing circuit is configured to input a gamma voltage to the data register of the source driving circuit. The turn-on and turn-off circuit is configured to input a turn-on voltage or a turn-off voltage to the gate driving circuit, so as to control the gate driving circuit to be turned on or turned off.

The data register of the source driving circuit is configured to output the received gamma voltage to the level converter under the selection of the data signals. The level converter is configured to level convert the gamma voltage, and output the converted gamma voltage to the D/A conversion circuit. The D/A conversion circuit is configured to convert the gamma voltage to generate a source driving voltage, and output the generated source driving voltage to the output buffer circuit. The output buffer circuit is configured to output the source driving voltage to the display panel 1.

It will be noted that, in the display apparatus provided by the above embodiments, the display apparatus is able to automatically switch to the narrow viewing angle or the wide viewing angle depending on whether the display is in the first usage state or the second usage state according to the monitoring results. Of course, it is also possible for the user to manually control button(s) (similar to a button used in a mobile phone for controlling whether the mobile phone is in a silent mode or a ring mode) in the display apparatus according to their own needs to switch between the narrow viewing angle and the wide viewing angle of the display apparatus. Regardless of a switching method, switching between the narrow viewing angle and the wide viewing angle of the display apparatus may be achieved.

Figure 14:
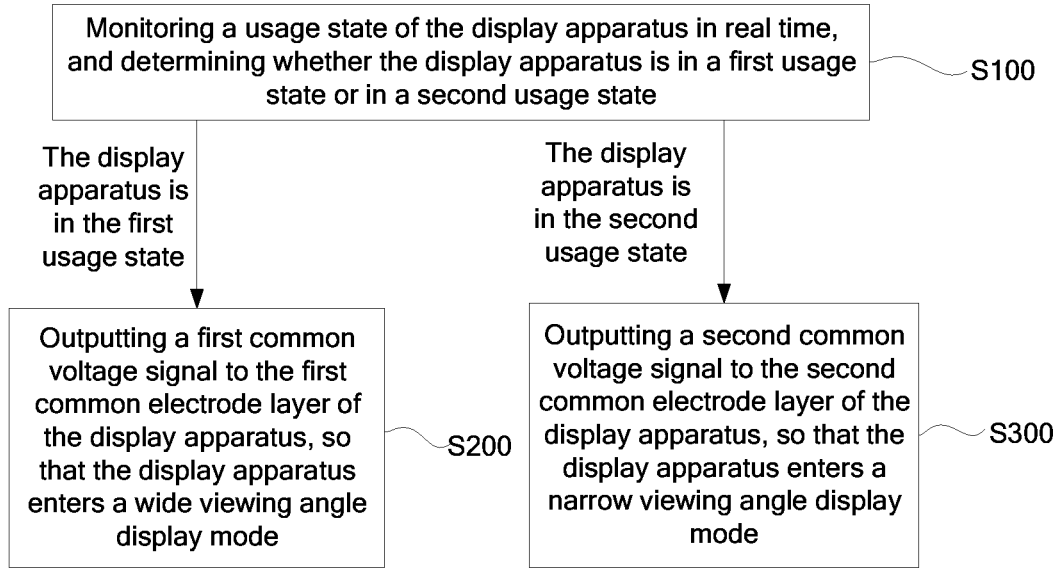
FIG. 14 is a flow chart of a control method of a display apparatus, in accordance with some embodiments.

Some embodiments of the present disclosure provide a control method of a display apparatus. The control method is used for driving the display apparatus 100 as described in the above embodiments. As shown in FIG. 14, the control method includes step 100 to step 300 (S100~S300):

S100: monitoring a usage state of the display apparatus in real time, and determining whether the display apparatus is in a first usage state or in a second usage state;

S200: in response to determining that the display apparatus is in the first usage state, outputting a first common voltage signal to the first common electrode layer of the display apparatus, so that the display apparatus enters a wide viewing angle display mode; and S300: in response to determining that the display apparatus is in the second usage state, outputting a second common voltage signal to the second common electrode layer of the display apparatus, so that the display apparatus enters a narrow viewing angle display mode.

An order of S200 and S300 may be interchanged.

Based on this, the usage state of the display apparatus may be determined according to real-time monitoring results of the usage state of the display apparatus, and then the display apparatus may automatically switch to the wide viewing angle or the narrow viewing angle according to the usage state. In this way, the display apparatus 100 only needs to determine which usage state it is in, and then automatically switch to the required narrow viewing angle display mode or wide viewing angle display mode. No manual operation by the user is required.

Figure 15:
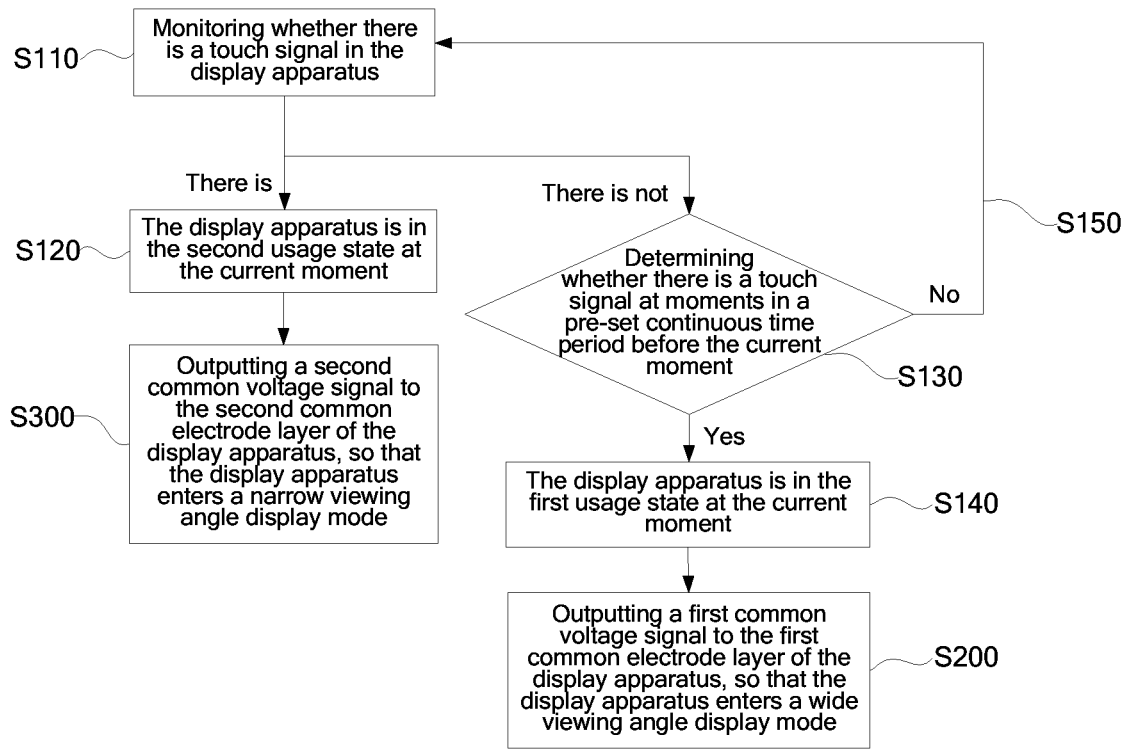
FIG. 15 is a flow chart of another control method of a display apparatus, in accordance with some embodiments.

As shown in FIG. 15, in some embodiments, the above S100 includes step 110 to step 150 (S110-S150):

S110: monitoring whether there is a touch signal in the display apparatus;

S120: if there is a touch signal at a current moment, determining that the display apparatus is in the second usage state at the current moment;

S130: if there is no touch signal at a current moment, determining whether there is a touch signal at moments in a pre-set continuous time period before the current moment;

S140: if there is no touch signal at moments in a pre-set continuous time period before the current moment, determining that the display apparatus is in the first usage state at the current moment; and S150: if there are touch signal(s) at moments in a pre-set continuous time period before the current moment, returning to S110 to monitor whether there is a touch signal in the display apparatus at a next moment.

The pre-set continuous time period is a continuous time period between a start point and an end point, with the start point being a certain moment before the current moment and the end point being the current moment. In some examples, the pre-set continuous time period is 2 minutes to 5 minutes. For example, the pre-set continuous time period is set to 3 minutes.

In this way, the usage state of the display apparatus may be determined according to real-time monitoring results of touch signals in the display apparatus, and then the display apparatus may be switched to the wide viewing angle or the narrow viewing angle according to the usage state.

Some embodiments of the present disclosure provide a non-transitory computer-readable storage medium storing executable instructions that, when executed by a display apparatus, cause the display apparatus to perform the control method of the display apparatus described above.

In some embodiments, the above non-transitory computer-readable storage medium is a read-only memory (ROM), a random access memory (RAM), a magnetic disk, an optical disk, or various other media that can store executable instructions.

In the above description of the embodiments, specific features, structures, materials or characteristics may be combined in any suitable manner in any one or more embodiments or examples.

The foregoing descriptions are merely some specific implementation manners of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A display apparatus, comprising:
   a display panel, wherein the display panel comprises:
   a first substrate, wherein the first substrate includes a first common electrode layer and a pixel electrode layer, and the first common electrode layer is configured to receive a first common voltage signal to form a first electric field with the pixel electrode layer;
   a second substrate disposed opposite to the first substrate, wherein the second substrate includes a second common electrode layer, and the second common electrode layer is configured to receive a second common voltage signal to form a second electric field with the pixel electrode layer; and
   a liquid crystal layer disposed between the first substrate and the second substrate;
   a controller electrically connected to the display panel, wherein the controller is configured to:
   monitor whether there is a touch signal in the display apparatus;

if there is a touch signal at a current moment, determining that the display apparatus is in a second usage state at the current moment;

if there is no touch signal at a current moment, determining whether there is a touch signal at moments in a pre-set continuous time period before the current moment; if there is no touch signal at moments in a pre-set continuous time period before the current moment, determining that the display apparatus is in a first usage state at the current moment; if there are touch signal(s) at moments in a pre-set continuous time period before the current moment, monitoring whether there is a touch signal in the display apparatus at a next moment;

generate a first control command in response to the display panel being in the first usage state, and generate a second control command in response to the display panel being in the second usage state wherein the pre-set continuous time period is a continuous time period between a start point and an end point, with the start point being a certain moment before the current moment and the end point being the current moment; and a common voltage generating circuit electrically connected to the controller and the display panel, wherein the common voltage generating circuit is configured to: generate the first common voltage signal and the second common voltage signal, transfer the first common voltage signal to the first common electrode layer of the display panel and not transfer the second common voltage signal to the second common electrode layer of the display panel in response to receiving the first control command, and transfer the second common voltage signal to the second common electrode layer of the display panel and not transfer the first common voltage signal to the first common electrode layer of the display panel in response to receiving the second control command.

2. The display apparatus according to claim 1, wherein the display panel has sub-pixel regions; and the second common electrode layer is selected from a group consisting of: a second common electrode layer including a first plate-shaped electrode, a second common electrode layer including strip-shaped electrodes, a second common electrode layer including block-shaped electrodes each of which is located in a corresponding sub-pixel region, and a second common electrode layer including slit electrodes each of which is located in a corresponding sub-pixel region.

3. The display apparatus according to claim 1, wherein the display panel has sub-pixel regions;

the first common electrode layer is disposed at a side of the pixel electrode layer facing away from the second common electrode layer;

the first common electrode layer is selected from a group consisting of: a first common electrode layer including a second plate-shaped electrode, a first common electrode layer including strip-shaped electrodes, a first common electrode layer including block-shaped electrodes each of which is located in a corresponding sub-pixel region, and a first common electrode layer including slit electrodes each of which is located in a corresponding sub-pixel region; and the pixel electrode layer includes slit electrodes each of which is located in a corresponding sub-pixel region.

4. The display apparatus according to claim 1, wherein the display panel has sub-pixel regions;

the pixel electrode layer is disposed at a side of the first common electrode layer facing away from the second common electrode layer;

the pixel electrode layer is selected from a group consisting of: a pixel electrode layer including block-shaped electrodes each of which is located in a corresponding sub-pixel region, and a pixel electrode layer including slit electrodes each of which is located in a corresponding sub-pixel region; and the first common electrode layer includes slit electrodes each of which is located in a corresponding sub-pixel region.

5. The display apparatus according to claim 1, wherein the display panel has sub-pixel regions;

the first common electrode layer and the pixel electrode layer are disposed in a same layer;

the pixel electrode layer includes first comb electrodes, and each first comb electrode is located in a corresponding sub-pixel region; the first common electrode layer includes second comb electrodes, and each second comb electrode is located in a corresponding sub-pixel region; and teeth of first and second comb electrodes that are located in a same sub-pixel region are alternately arranged and spaced apart.

6. The display apparatus according to claim 1, wherein the first substrate further includes:

a first base substrate, wherein the first common electrode layer and the pixel electrode layer are disposed at a side of the first base substrate facing the liquid crystal layer; and a touch layer disposed at a side of the first base substrate facing away from the liquid crystal layer.

7. The display apparatus according to claim 1, wherein the first substrate further includes:

a first base substrate, wherein the first common electrode layer and the pixel electrode layer are disposed at a side of the first base substrate facing the liquid crystal layer; and a touch layer disposed between the first base substrate and one of the first common electrode layer and the pixel electrode layer closer to the first base substrate.

8. The display apparatus according to claim 1, wherein the second substrate further includes:

a second base substrate, wherein the second common electrode layer is disposed on a side of the second base substrate facing the liquid crystal layer; and a touch layer disposed on a side of the second base substrate facing away from the liquid crystal layer.

9. The display apparatus according to claim 1, wherein the second substrate further includes:

a second base substrate, wherein the second common electrode layer is disposed on a side of the second base substrate facing the liquid crystal layer; and a touch layer disposed between the second base substrate and the second common electrode layer.

10. The display apparatus according to claim 1, wherein the display panel has sub-pixel regions, and the first substrate further includes:

a first base substrate, wherein the first common electrode layer and the pixel electrode layer are disposed at a side of the first base substrate facing the liquid crystal layer; and thin film transistors disposed at the side of the first base substrate facing the liquid crystal layer, each thin film transistor is located in a corresponding sub-pixel region, and is electrically connected to a portion of the pixel electrode layer located in the sub-pixel region.

11. The display apparatus according to claim 1, wherein the common voltage generating circuit includes:
- a main circuit electrically connected to the controller, wherein the main circuit is configured to: generate a first common voltage signal and a second common voltage signal, transfer the first common voltage signal in response to receiving the first control command, and transfer the second common voltage signal in response to receiving the second control command;
- a first common voltage output terminal electrically connected to the main circuit and the first common electrode layer of the display panel, wherein the first common voltage output terminal is configured to transfer the first common voltage signal to the first common electrode layer; and
- a second common voltage output terminal electrically connected to the main circuit and the second common electrode layer of the display panel, wherein the second common voltage output terminal is configured to transfer the second common voltage signal to the second common electrode layer.

12. The display apparatus according to claim 1, wherein the common voltage generating circuit includes:
- a logic circuit electrically connected to the controller, wherein the logic circuit is configured to: transfer the first control command to a first sub-circuit in response to receiving the first control command, and transfer the second control command to a second sub-circuit in response to receiving the second control command;
- the first sub-circuit electrically connected to the logic circuit and the first common electrode layer of the display panel, wherein the first sub-circuit is configured to: generate a first common voltage signal, and transfer the first common voltage signal to the first common electrode layer of the display panel in response to receiving the first control command; and
- the second sub-circuit electrically connected to the logic circuit and the second common electrode layer of the display panel, wherein the second sub-circuit is configured to: generate a second common voltage signal, and transfer the second common voltage signal to the second common electrode layer of the display panel in response to receiving the second control command.

13. A control method of a display apparatus, used for controlling the display apparatus according to claim 1, the control method comprising:
- monitoring a usage state of the display apparatus in real time, and determining whether the display apparatus is in a first usage state or in a second usage state;
- in response to determining that the display apparatus is in the first usage state, outputting a first common voltage signal to the first common electrode layer of the display apparatus and not outputting a second common voltage signal to the second common electrode layer of the display apparatus, so that the display apparatus enters a wide viewing angle display mode; and
- in response to determining that the display apparatus is in the second usage state, outputting the second common voltage signal to the second common electrode layer of the display apparatus and not outputting the first common voltage signal to the first common electrode layer of the display apparatus, so that the display apparatus enters a narrow viewing angle display mode;

wherein the step of monitoring a usage state of the display apparatus in real time, and determining whether the display apparatus is in a first usage state or in a second usage state, includes:

monitoring whether there is a touch signal in the display apparatus;

if there is a touch signal at a current moment, determining that the display apparatus is in the second usage state at the current moment; and if there is no touch signal at a current moment, determining whether there is a touch signal at moments in a pre-set continuous time period before the current moment; if there is no touch signal at moments in a pre-set continuous time period before the current moment, determining that the display apparatus is in the first usage state at the current moment; if there are touch signal(s) at moments in a pre-set continuous time period before the current moment, monitoring whether there is a touch signal in the display apparatus at a next moment, wherein the pre-set continuous time period is a continuous time period between a start point and a end point, with the start point being a certain moment before the current moment and the end point being the current moment.

14. The control method according to claim 13, wherein the pre-set continuous time period is 2 to 5 minutes.

15. A non-transitory computer-readable storage medium storing executable instructions that, when executed by a display apparatus, cause the display apparatus to perform the control method of the display apparatus according to claim 13.

16. The display apparatus according to claim 1, wherein the pre-set continuous time period is 2 to 5 minutes.

* * * * *